Sept. 29, 1959 G. T. BAKER ET AL 2,907,007

MAGNETIC RECORDING EQUIPMENT

Filed March 25, 1955 3 Sheets-Sheet 1

Inventors:
George Thomas Baker and John Evelyn Wright
by [signature]
Attorney

Sept. 29, 1959 G. T. BAKER ET AL 2,907,007

MAGNETIC RECORDING EQUIPMENT

Filed March 25, 1955 3 Sheets-Sheet 2

Inventors:
George Thomas Baker and John Evelyn Wright
by Deane Stechley
Attorney Sept. 29, 1959 G. T. BAKER ET AL 2,907,007

MAGNETIC RECORDING EQUIPMENT

Filed March 25, 1955 3 Sheets-Sheet 3

Inventors:
George Thomas Baker and John Jevelyn Wright
by Dowse Stirling
Attorney

United States Patent Office 2,907,007

Patented Sept. 29, 1959

2,907,007

MAGNETIC RECORDING EQUIPMENT

George Thomas Baker and John Evelyn Wright, Taplow, England, assignors to British Telecommunications Research Limited, Taplow, England, a British company

Application March 25, 1955, Serial No. 496,905

Claims priority, application Great Britain March 29, 1954

3 Claims. (Cl. 340—174)

The present invention relates to magnetic recording equipment and as regards one aspect is more particularly concerned with equipment of the drum type. By this is meant equipment in which a cylindrical drum having a magnetisable surface is rotated at a closely controlled speed and information is recorded thereon by the selective magnetisation of unit areas forming one or more circumferential tracks. The registering of the information is effected by one or more writing heads associated with each track and the extraction of the information when required is similarly effected by one or more reading heads. Though the functions of the reading and writing heads are essentially different, it has certain advantages if the same physical construction is employed for each of them and it is even possible for the same piece of equipment to act in both capacities substantially simultaneously.

The feasibility of constructing a register device of this kind is now well appreciated but a number of difficulties arise when carrying this concept into practice. The present invention is primarily concerned with the construction of an improved device of this type whereby it may be made of very compact form.

According to the invention in a magnetic drum recorder having a rotatable cylindrical surface of magnetic material suitable for recording information, for instance, in the form of binary digits, the rotatable member carrying the cylindrical surface is in the form of a bell or circular disc with an outer flange or skirt depending from it, the disc being secured to a central vertical shaft mounted in bearings so that the shaft rotates within a fixed hollow pillar carrying the stator of a driving electric motor, the stator co-operating with a rotor secured to the disc for instance by way of an inner flange depending therefrom.

If separate reading and writing heads are to be used, they obviously cannot occupy the same physical position and preferably the reading and writing heads for the different tracks are mounted in suitable stacks a sufficient distance apart to give adequate mechanical separation and the heads for alternate tracks are grouped into separate stacks. The reading and writing heads for any one track are conveniently located 180° apart and arrangements may also be provided for locating a further stack of reading or writing heads a predetermined distance ahead of or behind the main stacks.

Figure 1:
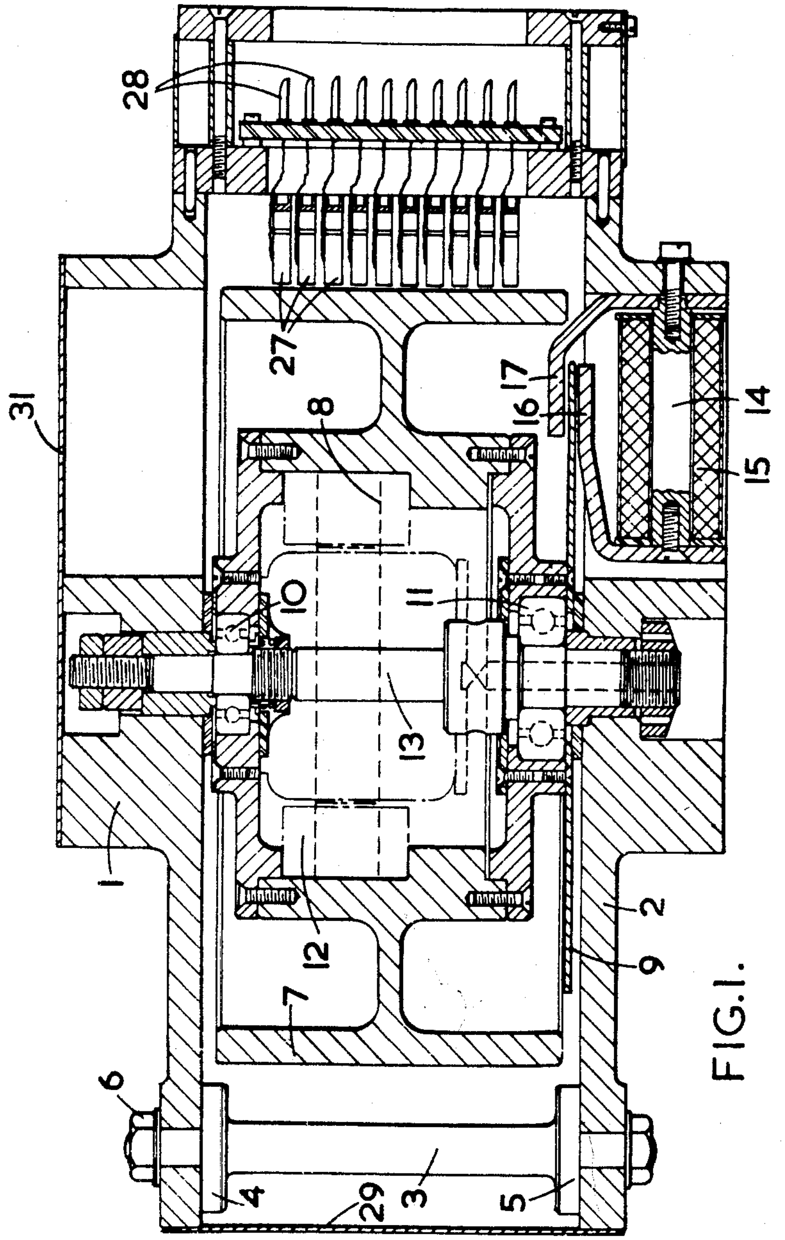
Figure 2:
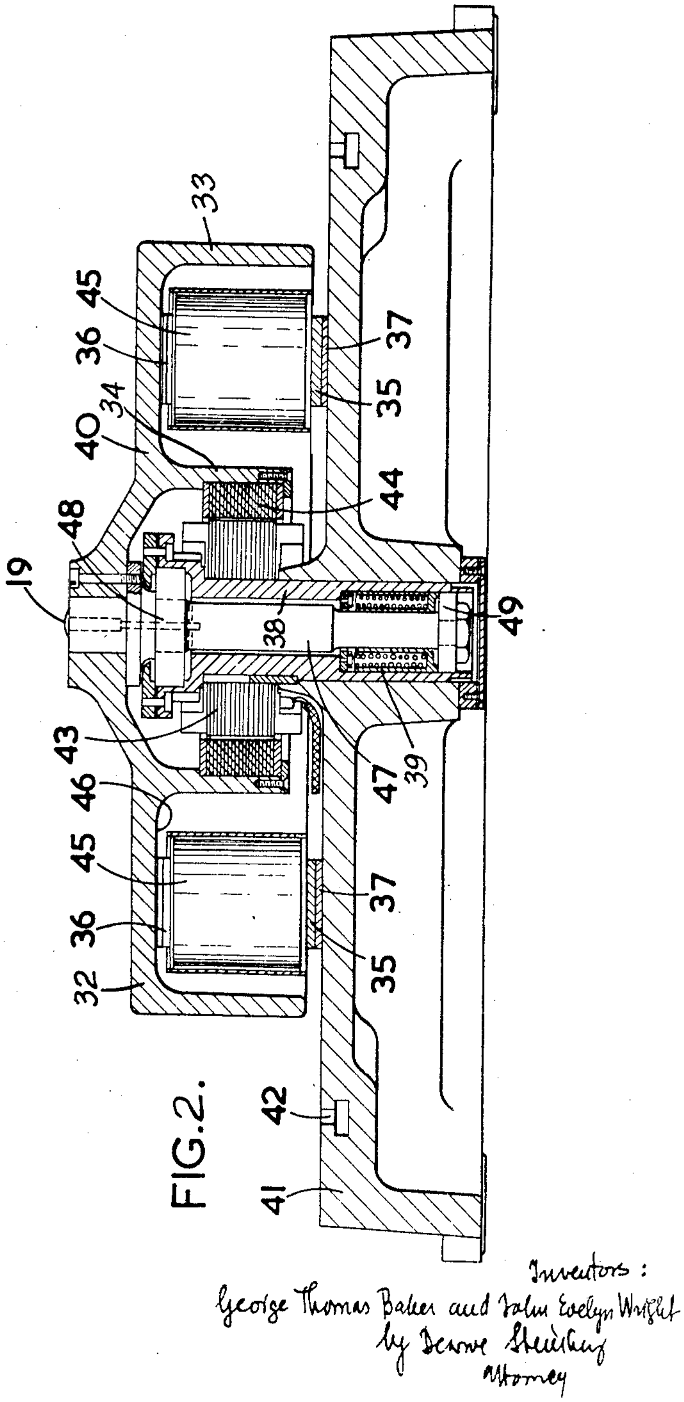
Figure 3:
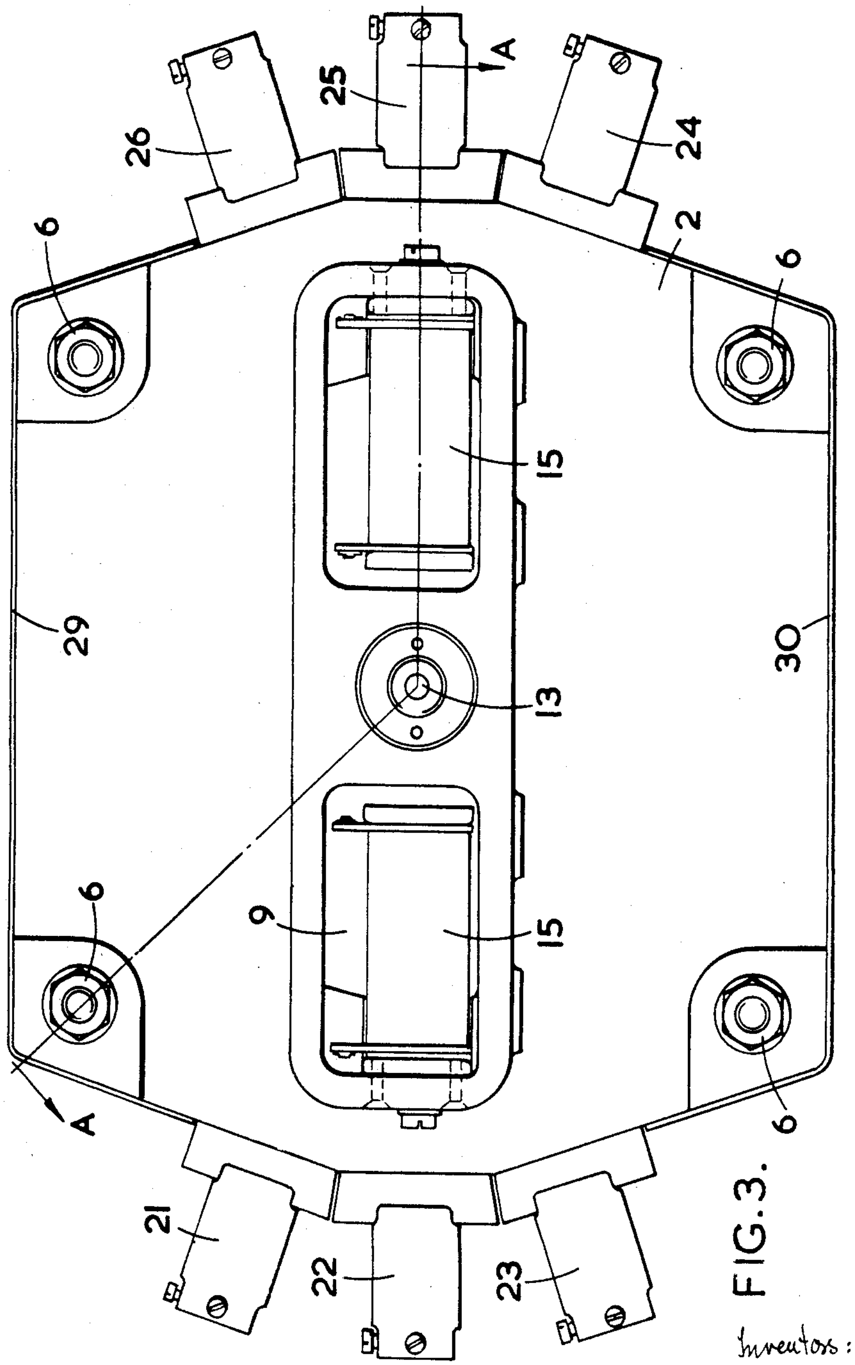

The invention will be better understood from the following description of one method of carrying it into effect which should be taken in conjunction with Figures 1, 2 and 3 of the accompanying drawings. Fig. 1 shows in section a known form of drum or so-called double-T section. Figure 2 shows in similar section a drum of the bell or mushroom type embodying the invention and Fig. 3 is an inverted plan of a drum of the type shown in Fig. 1, illustrating the location of six stacks of reading and writing heads divided into two groups of three.

Considering now the known embodiment shown in Fig. 1, the drum assembly comprises two end plates 1 and 2 which are spaced apart by four supporting pillars 3 provided with collars 4 and 5. The assembly can thus be held rigidly together by tightening the nuts 6 on the threaded ends of the pillars. The rotating assembly comprises essentially the drum proper 7 having an outer magnetised surface which may be produced by electrodeposition of a suitable layer of nickel. The boss of the drum carries the squirrel cage rotor 8 and the eddy current disc 9 and the rotating portion is mounted on the races 10 and 11, the lower race 11 being somewhat larger than the upper race 10.

The co-operating portion of the electric drive motor is provided by the stator assembly 12 secured to the shaft 13 which is fixed to the end plates 1 and 2. The eddy current disc 9 co-operates with the braking electromagnets, one coil of which as shown in Fig. 1 includes the core 14, the coil 15 and polepieces 16 and 17.

Considering now the arrangement of Fig. 2, it will be seen that the drum 40, which is of bell or mushroom shape, is mounted on a base plate 41 which serves for the support of the stacks of reading and writing heads (not shown), which are adjustably mounted by means of the T-shaped slot 42. The bell may be considered as comprising a circular disc 32 forming the upper surface, an outer flange or skirt 33, the outer surface of which forms the magnetic recording surface and an inner flange 34. As in the form shown in Fig. 1, the driving electric motor comprising stator 43 and rotor 44 is located inside the drum and the brake magnets are mounted on the base plate so as to operate on the interior surface 46 of the disc portion 32. The rotor is mounted on the inner flange 34 depending from the disc portion 32 of the bell. In this case the central shaft 47 is rotatable within the hollow pillar 38 fixed to the base plate and the main weight of the drum is taken by the upper bearing 48, the lower bearing 49 which is mounted on the spring 39 merely exerting a steadying effect. Each of the brake magnets comprises a pair of coils 45 mounted on soft iron cores which are joined by a soft iron base 35 and provided with polepieces 36. The magnets are mounted on packing pieces or shims 37 to enable the polepieces to be brought into suitable proximity to the surface 46 of the drum.

The reading and writing heads, which are identical in mechanical construction, are arranged in six stacks 21–26, each stack, including ten heads such as 27. Each head comprises essentially a support of brass or other non-magnetic material having a circular gap at the end in which is located the coil with appropriate polepieces. The electrical connections are brought out to the soldering tags 28 and the equipment is enclosed by the cover plates 29 and 30 extending in a circumferential direction and the plate 31 extending at right angles to the axis of rotation. It will be appreciated that all the heads in each stack may not always be required depending on the nature of the information which is stored in any particular track.

We claim:

1. A magnetic drum recorder comprising in combination, a baseplate, a circular disc member, an outer flange or skirt depending from said disc and having a magnetisable outer surface, a central shaft secured to and extending downwardly from said disc, a hollow pillar attached to said baseplate, bearings on said pillar for said shaft, stator windings of an electric motor on the outer side of said pillar, an inner flange depending from said disc, a rotor for said motor attached to said inner flange so as to co-operate with said stator windings, an electromagnet attached to said baseplate, and polepieces for said electromagnet adjacent to and arranged to co-operate with the inner surface of said disc between said inner and outer flanges to exercise a braking effect thereon when said electromagnet is suitably energised.

2. A magnetic drum recorder comprising in combination, a baseplate, a circular disc member, an outer flange or skirt depending from said disc and having a magnetisable outer surface, a central shaft secured to and extending downwardly from said disc, a hollow pillar attached to said baseplate, bearings on said pillar for said shaft, stator windings of an electric motor on the outer side of said pillar, an inner flange depending from said disc, a rotor for said motor attached to said inner flange so as to co-operate with said stator windings, an electromagnet attached to said baseplate, polepieces for said electromagnet adjacent to and arranged to co-operate with the inner surface of said disc between said inner and outer flanges to exercise a braking effect thereon when said electromagnet is suitably energised, and a circular inverted-T-section slot in the upper surface of said baseplate concentric with said shaft and of greater diameter than said outer flange for facilitating the adjustable mounting of stacks of reading and writing heads to co-operate with said magnetisable outer surface of said outer flange.

3. A magnetic drum recorder as claimed in claim 2 in which four stacks of heads are provided, the heads for alternate circumferential tracks on said magnetisable outer surface being grouped into separate stacks and the reading and writing heads for any one track being located 180° apart.

References Cited in the file of this patent

UNITED STATES PATENTS

| | | |
|---|---|---|
| 2,207,251 | Guedon | July 9, 1940 |
| 2,585,913 | Camras | Feb. 19, 1952 |
| 2,594,414 | Garreau | Apr. 29, 1952 |
| 2,612,681 | Camras | Oct. 7, 1952 |
| 2,676,392 | Buhrendorf | Apr. 27, 1954 |
| 2,694,192 | Dean et al. | Nov. 9, 1954 |
| 2,756,280 | Rettinger | July 24, 1956 |
| 2,790,966 | Malbon et al. | Apr. 30, 1957 |